United States Patent [19]

Horzepa et al.

[11] 4,118,246

[45] Oct. 3, 1978

[54] PROCESS FOR PRODUCING CLAY SLURRIES

[75] Inventors: John P. Horzepa, Edison; David E. Potts, Millington, both of N.J.

[73] Assignee: Engelhard Minerals & Chemicals Corporation, Edison, N.J.

[21] Appl. No.: 835,510

[22] Filed: Sep. 22, 1977

[51] Int. Cl.$^2$ .............................................. C09C 1/42
[52] U.S. Cl. .............................. 106/288 B; 106/309; 106/72
[58] Field of Search ...................... 106/288 B, 72, 309

[56] References Cited

U.S. PATENT DOCUMENTS

| | | | |
|---|---|---|---|
| 3,326,705 | 6/1967 | Duke | 106/288 B |
| 3,806,050 | 4/1974 | Cumpston, Jr. | 241/260 |
| 4,018,673 | 4/1977 | Hughes et al. | 106/72 |

*Primary Examiner*—Winston A. Douglas
*Assistant Examiner*—J. V. Howard
*Attorney, Agent, or Firm*—Inez L. Moselle

[57] ABSTRACT

Disclosed is a novel process for manufacturing stable, fluid highly concentrated dispersed aqueous suspensions of calcined clay. The process utilizes the micromixer described in U.S. Pat. No. 3,806,052 to Edward H. Cumpston, Jr. Dry calcined clay is fed to the inlet hopper of the micromixer and mixed with water and one or more conventional clay dispersants before the clay enters the centrifugal zone of the micromixer. A smooth but extremely dilatant paste is discharged from the mill after this first pass. The paste is then recirculated through the micromixer a plurality of times at a higher throughput rate than that used in the first pass.

10 Claims, No Drawings

PROCESS FOR PRODUCING CLAY SLURRIES

BACKGROUND OF THE INVENTION

Kaolin clay pigments used by the paper and paint industry are available in uncalcined (hydrated) and calcined (dehydrated) grades. When preparing aqueous coating or paper filling compositions containing calcined or uncalcined kaolin pigments, it is frequently desirable to provide the clay in the form of a concentrated aqueous suspension or slurry. The suspensions must be sufficiently fluid at both high and low rates of shear to be handled by conventional mixers and pumps.

When the clay is hydrated and has a limited content of particles larger that 2 microns (equivalent spherical diameter) it is relatively simple to produce stable, dispersed slurries containing up to about 70% clay solids on a weight basis. To manufacture these slurries a deflocculating agent (dispersant) such as tetrasodium pyrophosphate is added to clay in the form of a filter cake which typically contains about 60% solids. Additional dry clay is incorporated with mild agitation until a suspension having the desired high solids content is produced. The processing is conventionally referred to as "makedown." The resulting suspension of fine hyrated kaolin clay is stable in the sense that when it is allowed to stand, there is minimal settling of particles to form a dense sediment and there is minimal formation of a clear or cloudy supernatant liquid layer. This is attributable to the fact that suspensions of fine hydrated clay are fairly viscous and contain only small amounts of coarse particles. Few particles of clay, if any, have sufficient mass to settle under the influence of gravity.

In the case of clay pigments that contain significant amounts of course particles, especially particles larger than 2 microns, and the contents of ultrafine particles is low, there is a marked tendency of the course particles to settle out of deflocculated aqueous suspension of the clay. For example, 70% deflocculated suspensions of relatively coarse filler grades of hydrated clay tend to form hard sediments during shipment or storage. These filler clays usually contain at least 2% by weight of particles larger than 5 microns and at least 35% by weight of particles larger than 2 microns.

Calcined kaolin clay pigments generally have particle size distributions similar to those of high grade filler clays. High solids suspensions of calcined kaolin pigments therefore tend to form hard sediments during storage. Furthermore, deflocculated aqueous suspensions of calcined clay pigments have unusual rheological (viscosity) properties and they are very difficult to manufacture. Calcined kaolin clays usually cannot be prepared into suspensions containing more than about 60% clay by conventional techniques without producing systems which are excessively dilatant and resemble wet sands. When a ruler is dropped into a fluid concentrated slurry of calcined clay prepared by a conventional clay makedown procedure, it may be impossible to remove the ruler unless the ruler is removed very slowly. The shearing force applied to the suspension results in the conversion of the original fluid system to the dilatant mass which becomes increasingly viscous as the rate of shear increases. Processing equipment such as mixers and pumps would be damaged by such highly dilatant suspensions or the equipment would simply stop operating.

PRIOR ART

It has been suggested (U.S. Pat. No. 3,014,362 to Proctor) to reduce the viscosity of calcined kaolin clay pigments or fillers by milling the calcined clay under wet or dry conditions. The preferred procedure as set forth in the Proctor patent is to deflocculate a 55 to 60% solids suspension of calcined clay with a conventional amount of a clay dispersant and ball mill the suspension for 12 to 14 hours. The slip of ball milled clay is subsequently flocculated by adding an acid or alum and this is followed by drying. The resulting dried clay must then be mixed with water and dispersing agent to produce the desired high solids suspension. Proctor did not attempt to produce directly the desired high solids suspension of calcined clay and he was not concerned with the sedimentation properties of his products.

U.S. Pat. No. 3,754,712 to Cecil is concerned with a method for preparing fluid high solids suspensions of calcined clay which are stable without the necessity of adding colloidal thickening agents. Cecil's process involves pebble milling a slurry of calcined clay and gradually adding more clay to increase solids while the slurry is being milled. In the illustrative example, milling was carried out in a ball mill loaded with a mixture of "Burundum" cylinders. Total mixing time to produce a 7½% solids suspension of SATINTONE® No. 1 calcined clay was 7 hours. A principal disadvantage of this method is that it requires excessively long grinding time and is wasteful of energy. In practice the grinding media tends to stick together and running time is wasted while the media that stick together break loose. Furthermore, the Cecil technique is basically a batch technique and it would be difficult and expensive to scale up such a process to a continuous manufacturing operation.

In accordance with U.S. Pat. No. 4,017,325 to Eggers, aqueous slurries containing 50% or more of calcined clay are prepared by employing a mixture of the calcined clay with a significant amount of hydrated kaolin clay. Practice of the invention necessitates the use of large amounts of additives including dispersants and suspending agents. This technique necessitates dilution of the calcined clay with substantial amounts of hydrated clay and thus limits the utility of the products for some end use applications. Furthermore, the high solids slurries are undesirably dilatant.

An object of the instant invention is to overcome the limitations of prior art processes for manufacturing high solids slurries of kaolin clay.

THE INVENTION

Applicants have invented or discovered a novel technique for preparing stable high solids slurries of calcined clay. Practice of the invention entails the use of one or more micromixers such as described in U.S. Pat. No. 3,806,050 to Cumpston, Jr. This mixer, which is a continuous device, has a cylindrical stator shell and rotor and has helical refining surfaces on the rotor and the stator. There are formed of blocks held in place on the rotor and the stator. The blocks have teeth oriented in different aspects to the relative motion between the rotor and the stator. The blocks are arranged in desired patterns to accomplish optimum mixing.

In the first stage of applicants' process the micromixer is used in conventional manner to make down a slurry of calcined clay. Thus, dry clay is charged by a suitable feeding mechanism into the inlet of the mixer and water containing a dissolved dispersant is pumped into the machine in a manner such that the solution of dispersant comes into contact with the clay before the clay advances to the centrifugal feed zone and thereafter is acted upon by the rotor-stator mechanism. A smooth but dilatant slurry emerges from the discharge end of the mill. The relative proportions of clay and water in the mass during this initial pass through the mill is such that the mixture is fluid in the absence of shear but is highly viscous when subjected to high shear. Furthermore, the mixture must contain somewhat more water than is desired in the finished slurry product. Preferably the clay solids level is in the range of about 63 to 67% by weight. When the desired amount of smooth dilatant slurry has been produced, the dry feeder and water pump are shut off and the dilatant smooth slurry is pumped directly into the feed inlet of the machine at a higher rate than the rate used in the initial pass. Alternatively the process can be carried out on a continuous basis by using one micromixer for the initial makedown pass and another (or more) micromixer(s) for recirculation. The slurry is continuously recycled through the machine at the higher velocity, whereby the temperature of the slurry increases and dilatancy is gradually reduced. Typically the slurry is recirculated from 5 to 10 times during which the solids will have increased to a higher level due to evaporation of water. After the slurry batch has been recirculated through the micromixer for the desired number of passes, the slurry product is ready for shipment or further treatment such as addition of a suspending agent. Fluid slurries having minimal dilatancy and improved stability are produced. Preferably these slurries contain about 68 to 71% solids.

Slurries of calcined clay containing up to about 71% solids can be produced in the micromixer when it is utilized in conventional manner, namely as a single pass operation with no recirculation. However, the rheological properties of the resulting slurries are far inferior to the high solids slurries made in accordance with the instant invention since practice of the invention eliminates or minimizes dilatancy. Furthermore, practice of the invention results in slurries with reduced tendency to form dense sediments during storage as compared to slurries produced in the micromixer using a single pass without recirculation.

PREFERRED EMBODIMENTS

Apparatus used in carrying out the invention is known as a "Micar." This unit is covered by U.S. Pat. No. 3,806,050 to Edward H. Cumpston, Jr., the disclosure of which, including the drawings, is incorporated herein by cross-reference. The Micar is basically a horizontal continuous rotor and stator unit with helical ridges on both stator shell and rotor. The shell and the rotor each have bars arranged in a variety of angles to the horizontal axis with a small positive clearance, about ¼ inch, between the ridges on the rotor and the shell. The ridges on the coaxial internal rotor provide intense shearing action. The ridges on the stator shell control feedthrough and provide considerable backmixing. The ridges on both rotor and stator are provided by discrete raised bars arranged and spaced to allow viscous material to move between the bars without plugging. Most of the raised bars on the rotor and the stator are inclined relative to the motion between rotor and stator; some of the bars are oriented to feed the viscous material and others are oriented to retard the viscous material. The inclined bars on the rotor are designed to force the material through the stator bars before material completely fills the volume between the rotor and the stator.

A commercially available embodiment of the invention covered by U.S. Pat. No. 3,806,050 is illustrated schematically in "MICAR — Multiapplication Mixing Machine — Bodes Startling Benefits For Several Steps of Pulp & Paper Making," PAPER AGE — October 1976, page 9. As described in this publication and literature supplied by the manufacturer, rotor speed ranges between 3000 and 5000 feet per minute velocity of rotor tips. Material is fed by gravity at one end through a centrifugal zone. Processed feed is discharged by gravity at the other end after undergoing intensive impact shearing provided by the protrusion from the rotor and the stator shell that are separated a short distance from each other. The intense mixing action is referred to as "micromixing" in the publication. A unique feature of the Micar unit is that work input per unit weight of feed is independent of feed rate. Thus, doubling feed rate doubles the power consumed.

The calcined kaolin clay feed material should be provided as a dry powder or pulverulent mass. Recommended is calcined kaolin pulverized fine enough to pass through a 325 mesh (Tyler) screen. Provided a feed mechanism capable of feeding such material at a uniform rate is available, the calcined clay can be in the form of a damp mass, for example a mixture of clay and water containing from about 1% to 25% water on a weight basis. Optionally the calcined clay may be blended with a minor amount (e.g. 1% to 20% based on the dry weight of the clay) of mineral pigments such as titania, hydrated kaolin clay or calcium carbonate. Commercial calcined kaolin pigments produced by controlled calcination at 1350° to 2200° F. of purified hydrated kaolin clays may be employed. Commercial products include products known as "SATIN-TONE" ® clay and "ANSILEX" ® clay. Calcined clay pigments usually contain from 10% to 30% by weight of particles larger than 5 microns (e.s.d.) and at least 35% larger than 2 microns.

Known clay dispersants such as alkali metal condensed phosphates, exemplified by tetrasodium pyrophosphate (TSPP), amino hydroxy compounds such as 2-amino, 2-methyl, 1-propanol (AMP), sodium citrate, sodium naphthalene formaldehyde condensates exemplified by Tamol 850, are used alone or in combination as the dispersing (deflocculating) agent to prepare the feed to the mill. Recommended is the use of TSPP in amount within the range of 2 ½ to 5 lbs./ton calcined clay (dry basis) or mixtures of TSPP and AMP, each in amount in the range of 2 ½ to 5 lbs./ton of calcined clay (dry basis). When insufficient dispersant is employed, 70% solids suspensions of desired viscosity cannot be prepared. On the other hand, when too much dispersant is used, an undesirable hard sediment may form when the high solids slurry of calcined clay is allowed to stand.

The amount of water charged to the Micar with the calcined kaolin clay before the clay enters the centrifugal feed zone must be carefully controlled. Sufficient water must be present to provide a mass that is fluid in the absence of shear but is highly viscous when subjected to the high shearing action of the machine. Typically the amount of water that is required is sufficient to form a mixture having a clay solids content in the range of 60 to 70% by weight, preferably in the range of about 63 to 67%. When too much water is present, for example water sufficient to form a 55% solids slurry, the clay-water system will be too fluid even under high shear mixing action, to benefit from the processing because very little work will be applied under this condition. In some cases, a 60% solids slurry will not be sufficiently viscous under high shear. When insufficient water is present, for example when water is utilized in an amount that results in an initial system containing over 72% clay solids, the desired fluid dispersed high solids slurry of calcined clay will not be obtained. Instead a mixture of dry clumps and liquid containing low solids content will emerge from the Micar unit. When the solids level is 70% or somewhat higher, the finished product may be too concentrated to have acceptable rheology. Thus, it is especially preferred to charge the machine with calcined clay and water to produce a 63 to 67% solids initial slurry to produce end products containing about 68 to about 71% solids. Dry clay can be fed continuously through the feed hopper by means such as a Vibra-Screw feeder or a twin-screw mixture before the clay enters the centrifugal feed zone of the machine. When using the preferred dry clay, all of the water that is required may be pumped into the unit in a manner such that the water comes into contact with the clay charge before the clay advances to the centrifugal zone. Commercial micromixers are provided with suitable feed systems for water. The water preferably contains the dispersant at desired concentration. When feeding damp clay, additional water containing the dispersant can be pumped into the machine before the clay enters the centrifugal feed zone.

Throughput rate in the Micar is controlled by the feed rate in the inlet hopper. In the initial passage of the clay to form the high solids dispersed slurry, dry clay can be charged to the gravity feeder at a rate in the range of about 3 to 10 pounds per minute when using a unit that is 16 inches long and has a 8 inch diameter. Water containing dissolved dispersant can be pumped in at an appropriate rate, typically in the range of ¼ to ½ gallon per minute when using the 8 inch diameter unit. The solids content of the resulting smooth, dilatant slurry is determined by the proportion of clay and water charged to the feed end and is thus in the range of about 60 to 70% by weight. After a sufficient amount of initial dilatant slurry has been produced, the feeder and water pump are shut off and the slurry is poured directly into the inlet hopper at a higher feed rate than used initailly for feeding the starting clay, generally in the range of 25 to 75 pounds slurry per minute. In some cases it may be desirable to dilute the initial slurry to about 65% solids before the slurry is recycled through the mixer. During recirculation the solids level of the slurry will increase due to evaporation and dilatancy will be decreased gradually. For example, when the initial slurry is formulated at 67% solids, recycling 5 times will increase solids to 68% and 10 recycles will increase solids to 71%. The 71% solids slurry may be less dilatant than the 67% solids slurry and is considerably less dilatant and more stable than a 71% solids slurry of the same calcined clay would be if produced by a single pass in the mill without recirculation.

In some cases it will be desirable or necessary to incorporate an organic colloid such as CMC, hydroxyethylcellulose or an alginate to stablize the slurries against sedimentation. Generally the need for an organic stablizer is minimized by increasing the number of passes of the slurry through the mixer.

Tests were carried out in attempts to prepare high solids slurries of SATINTONE® No. 1 calcined clay be various techniques. Seven hours was required to produce a 70.5% solids suspension of this commercial clay pigment by the batch pebble milling technique in the illustrative example of the Cecil patent. Initial tests were carried out in a Micar unit (8 inch diameter by 16 inches long). The rotor operated at 1500 r.p.m. (3000 surface feet per minute). A 50 hp. synchronous motor turned the rotor. Slurries of SATINTONE® clay as high as 71.3% solids could be obtained by using the machine in conventional manner (single pass). In these initial tests with slurry production rates of 4 to 5 pounds per minute, various dispersants, including a combination of tetrasodium pyrophosphate (TSPP) and AMP were employed. Some slurries were produced, but all were extremely dilatant and exhibited severe settling properties.

In accordance with this invention, dry SATINTONE® No. 1 was charged by a Vibra-screw feeder to the inlet hopper of the 8 inch Micar at a rate of 5 pounds per minute. Water containing dispersant was pumped into the unit at a position close to the blades. Feed rate was ½ gallon per minute. The water contained TSPP and AMP 95 in amounts, respectively, corresponding to 2 ½ and 2 ½ pounds per ton of SATINTONE® clay. The initial pass (makedown stage) resulted in a smooth but dilatant 65% solids slurry. The feeder and pump were shut off and the 65% solids slurry was charged to the feeder at a rate of about 50 pounds per minute. This was repeated four more times, producing a 69% solids slurry. Power consumption was 10–20 kw. during recirculation. It was found that work input per unit weight applied to the recirculated slurries was several times that applied in initial makedown.

In subsequent tests, a K-tron TO-60 twin screw feeder replaced the Vibra-screw feeder and tungsten carbind coated blades were used to minimize staining of the clay. SATINTONE® was fed at a rate of 5 lbs./min. The disperants dissolved in the feed water were AMP (6 lbs./ton) and TSPP (5 lbs./ton). Solids on initial makedown (first pass) was 70%. Gross power on initial makedown was 20 kw. Slurry temperature after makedown was 130° F. Gross work input was 140 hp. hr./ton. The 70% solids slurry was diluted with water to 65% solids and recirculated 5 times at a rate of about 50 lbs./min. Solids of the product was 70.8%. Total work input was 200 hp. hr./ton.

In another test, the initial solids of the slurry after first pass with clay feed at 5 lbs./min. was 67%. The dispersant was AMP 3 lbs./ton and TSPP 2.5 lbs./ton. Gross power on makedown was 12 kw. Solids after recirculating 5 times at 10 kw. was 68.2%. After recirculating 10 times, solids was 70.0%. Total work input after 10 passes was 240 hp. hrs./ton.

All slurries produced by recirculating slurries from the initial pass had significantly reduced dilatancy when compared to the slurry obtained by conventional use of the machine.

Obviously various changes and modifications may be made without departing from the spirit and scope of the invention.

We claim:

1. A method for producing a concentrated fluid aqueous slurry of finely divided particles of calcined kaolin clay which comprises charging said clay particles with water and a dispersant sufficient to form a fluid slurry of about 60 to 70% solids content to one end of a horizontal continuous rotor and stator unit with helical ridges on both stator shell and rotor to provide intense axial shearing action with controlled feedthrough and back mixing, said rotor operating at high speed, said clay particles and water being added in relative proportions such that the admixture discharged from the other end of the mill has a smooth consistency and is a fluid when no agitation is applied but is converted to a viscous dilatant mass when subjected to high shear mixing, discharging the resulting smooth dilatant makedown slurry from the other end of said unit, and recirculating said makedown slurry through said unit a multiplicity of times at a higher throughput rate than used to produce said smooth dilatant slurry, thereby producing a fluid concentrated slurry product having reduced dilatancy.

2. The method of claim 1 wherein said clay in initially charged at a rate in the range of 3 to 10 pounds per minute.

3. The method of claim 2 wherein said clay is recirculated at a rate of at least 20 pounds of slurry per minute.

4. The method of claim 1 wherein said clay and said water are added in relative proportions to produce a makedown slurry at about 63 to 67% solids and said slurry product obtained by recirculating said makedown slurry contains from about 67 to 71% solids.

5. The method of claim 1 wherein said rotor operates at a speed in the range of 3000 to 5000 feet per minute.

6. A method for producing a fluid concentrated slurry of calcined kaoline clay pigment which comprises charging dry calcined clay with water at a rate within the range of about 3 to 10 lbs./min. and water containing a dispersant and added at a rate to form with said clay a slurry of about 63 to 67% solids to one end of a horizontal continuous rotor and stator unit with helical ridges on both stator shell and rotor to provide intense axial shearing action with controlled feedthrough and back mixing, said rotor operating at a speed in the range between about 3000 to 5000 feet per minute velocity, discharging a smooth dilatant slurry from the other end of said unit, and recirculating said slurry through said unit a multiplicity of times at a rate in the range of about 20 to 50 lbs./min., thereby producing a fluid concentrated slurry having a solids content in the range of about 67 to 71%.

7. The method of claim 6 wherein said slurry is recirculated at least 5 times.

8. The method of claim 6 wherein said slurry is recirculated from 5 to 10 times.

9. The method of claim 6 wherein the work input during make-down and recirculation exceeds 100 hp. hrs./ton.

10. The method of claim 7 wherein the work input during make-down and recirculation is about 200 hp. hrs./ton.

* * * * *

UNITED STATES PATENT AND TRADEMARK OFFICE
CERTIFICATE OF CORRECTION

PATENT NO. : 4,118,246
DATED : October 3, 1978
INVENTOR(S) : John P. Horzepa et al It is certified that error appears in the above-identified patent and that said Letters Patent are hereby corrected as shown below:

Column 1 - line 43, should read -- filler clays usually contain at least 20% by weight of --.

Signed and Sealed this

Twenty-sixth Day of December 1978

[SEAL]

Attest:

RUTH C. MASON
Attesting Officer

DONALD W. BANNER
Commissioner of Patents and Trademarks